INVENTOR.
ANDREW T. LING
BY
Carl V. Olson
Attorney

INVENTOR.
ANDREW T. LING
BY
Carl V. Olson
Attorney 3,420,991
ERROR DETECTION SYSTEM Andrew T. Ling, Collingswood, N.J., assignor to Radio Corporation of America, a corporation of Delaware Filed Apr. 29, 1965, Ser. No. 451,916
U.S. Cl. 235—153 14 Claims
Int. Cl. G06c 25/00

ABSTRACT OF THE DISCLOSURE

A computer error detection system, which is more economical than parity-type systems, for use with a read-only memory or other apparatus which cyclically handles information words (consisting of mixed "1's" and "0's"), a test word (consisting for example of all "0's") and an inverted test word (onsisting of all "1's"). Each word handled contains an indication of the type of word which will follow. An error alarm is generated if the word being handled is not the type indicated by the previous word. The system detects erroneous presence and erroneous absence of electrical signal at all bit positions throughout the system.

Figure 1:
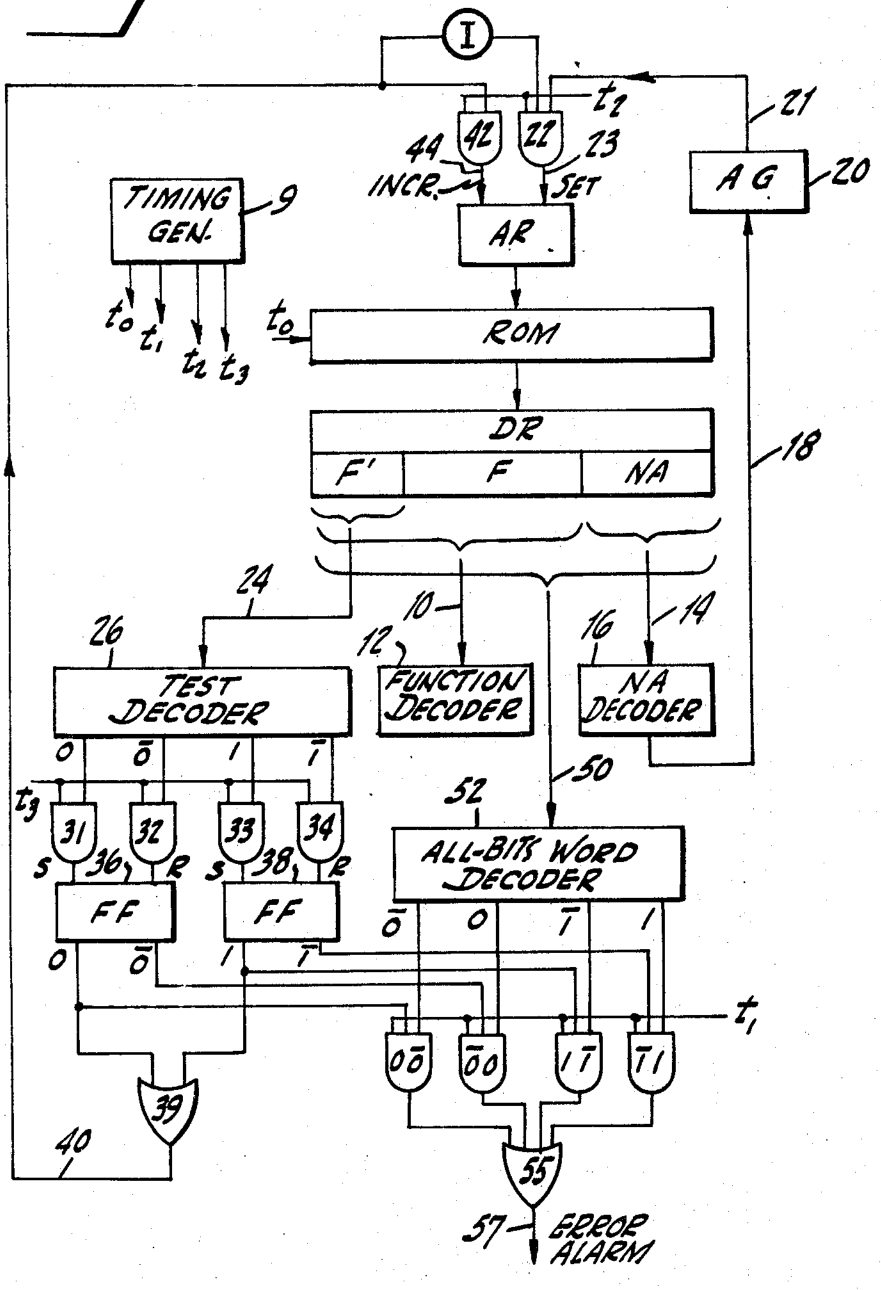

This invention relates to error detection systems for computers, and particularly to an error detection system which does not rely on the presence or absence of parity. While not limited thereto, the error detection circuit of the invention is particularly useful when used to detect errors in the operation of a fixed or read-only memory in a system for controlling the sequenced elementary operations or machine commands involved in the execution of instructions.

In error detection systems of the usual parity type, a group of bits representing information is protected by the addition of a parity bit. Equipment may be designed, for example, to handle a word consisting of seven binary bits in parallel, of which six are information bits and one is a parity bit. The parity bit location is made to contain either a "0" or a "1" so that the total number of "1's" in the seven-bit word is an even number (or odd number). Then any seven-bit word can be checked for parity and rejected as erroneous if the parity is wrong.

Six binary bits are capable of uniquely defining sixty-four different meanings (such as decimal numbers, alphabetic characters and symbols). Seven binary bits are capable of uniquely defining one hundred and twenty-eight different meanings. When one of the seven binary bits is a parity bit, there are six bits left for sixty-four information meanings. The parity bit is capable of having only one meaning—that parity is correct or in error. Thus, the equipments (such as the flip-flops) used for the parity bit in the example are expensive because they could be otherwise used for sixty-four additional information meanings.

The error-detection system according to the invention relies on a test word or words, rather than a parity bit in each word. For example, if the words are seven bits long, there are one hundred and twenty-eight different words. If two of the words (such as 0000000 and 1111111) are reserved for use as error testing words, the remaining one hundred and twenty-six words are available for information meanings.

It is, therefore a general object of the invention to provide an improved error detection system which is simple and economical.

It is another object to provide a memory system incorporating an improved error detection circuit.

In accordance with an example of the invention, there is provided an error checking circuit for use in a system cyclically handling information words (consisting of mixed "0's" and "1's"), and interspersed test words including a test word (consisting, for example, of all "0's") and an inverted test word (consisting of all "1's"). Each information word contains an indication of whether or not the following word in sequence is one of the test words. The system includes a register for the current word being handled. A test decoder means is coupled to the register to determine whether the next following word will be an information word or an all "0's" or all "1's" test word. A test storage means stores the output of the test decoder for use during the presence of the next following word. An all-bits word decoder means is coupled to the register and is used to determine whether the current word consists of mixed "0's" and "1's," or all "0's," or all "1's." An error indicating means is coupled to the test storage means and the all-bits word decoder means to generate an error signal when the output of the all-bits word decoder means does not agree with the output of the test storage means.

Figure 2:
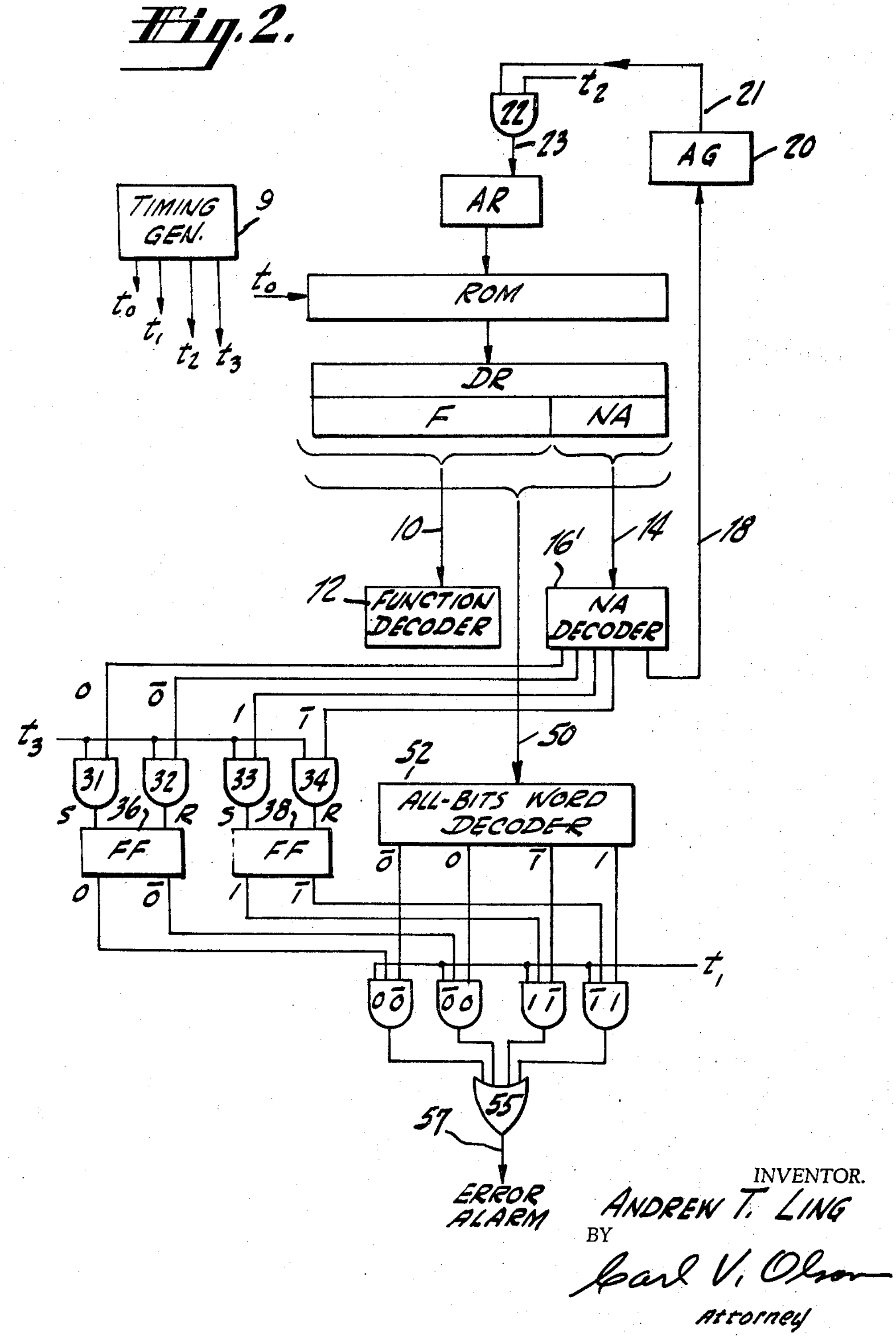

In the drawing:

FIG. 1 is a block diagram of a read-only memory system incorporating an error detection arrangement according to the teachings of the invention; and FIG. 2 is a block diagram of another similar system.

Referring now in greater detail to FIG. 1, there is shown a computer memory ROM having an address register AR and a data register DR. The memory ROM may be a read-only memory or any other conventional type in which the contents of the address register AR determines which one of many words stored in the memory is read out at time $t_0$ to the data register DR. Timing pulses, including timing pulse $t_0$ are supplied by a timing pulse generator 9.

The memory ROM may, according to an actual example, store 2,048 words of 53 bits each. Of these 2,048 words, 2,046 words are available for use as valid information words, one word is a test word and the remaining word is an inverted test word. The test word may be a word in which all of the bits are "0's," and the inverted test word may be a word in which all of the bits are "1's." The bits of the inverted test word are the inverse of the corresponding bits of the test word. The test word may consist of a given pattern of "0's" and "1's," and the inverted test word will then consist of a pattern of "0's" and "1's" in which each bit is the inverse of the corresponding bit in the given pattern. For example, the test word may be 00110011, etc., and the inverted test word will then be 11001100, etc. The use of a test word and an inverted test word permits the testing of the hardware handling each bit of the word for both a failure causing the erroneous presence of an electrical signal and a failure causing the erroneous absence of an electrical signal. An all "0's" test word and an all "1's" inverted test word is preferred and is employed in the example of the invention described herein. The data register DR is divided into portions corresponding with portions of each word stored in the memory. Portions of the data register labeled F′ and F are for bits indicative of the functions to be performed during the access of the memory word, and a portion NA is for bits indicative of the address of the next memory word to be accessed.

All of the bits present in the function portions F′ and F of the data register DR are conveyed over lines 10 to a function decoder 12. The function decoder 12 decodes the information received by it and supplies appropriate control signals over output lines (not shown) to other parts of the computer (including parts not shown) for the purpose of controlling sequenced elementary operations involved in the execution of instructions. The contents of the next address portion NA of the data register DR is coupled over lines 14 to a next address decoder 16.

The decoder 16 provides an output over lines 18 to an address generator 20 having an output applied over lines 21 and gates 22 to a set input 23 of the address register AR for the purpose of addressing the next following world in memory ROM.

The contents of the function portion F′ of the data register DR is coupled over lines 24 to a test decoder 26 having outputs labeled $\mathbf{0}$, $\bar{\mathbf{0}}$, $\mathbf{1}$ and $\bar{\mathbf{1}}$. The test decoder may be a conventional decoder constructed, for example, to receive six input bits and to recognize the presence or absence of two of the sixty-four possible bit patterns. For example, the bit pattern 000001 may cause the energization of decoder output 0, pattern 000010 may cause the energization of decoder output 1, and the absence of either of these two bit patterns will then cause the energization of both decoder outputs $\bar{\mathbf{0}}$ and $\bar{\mathbf{1}}$. The other sixty-two bit patterns are not decoded by test decoder 26, but rather are decoded by function decoder 12 for the performance of up to sixty-two functions.

The outputs of the decoder 26 are connected through "and" gates 31, 32, 33 and 34 to set and reset inputs S and R of test storage flip-flops 36 and 38. Gates 31, 32, 33 and 34 are enabled at time $t_3$ by a signal from timing generator 9. Flip-flops 36 and 38 have outputs labeled $\mathbf{0}$, $\bar{\mathbf{0}}$, $\mathbf{1}$ and $\bar{\mathbf{1}}$ in correspondence with the inputs thereto from test decoder 26. The output 0 of flip-flop 36 and the output 1 of flip-flop 38 are connected through an "or" gate 39, a line 40 and an "and" gate 42 to an incrementing input 44 of the address register AR. A signal on line 40 is also inverted by inverter I and supplied to an input of "and" gate 22. Gates 22 and 42 are enabled at time $t_2$ by a signal from timing generator 9.

The entire contents of the data register DR is coupled over lines 50 to an all-bits word decoder 52. An output 0 of word decoder 52 is energized if all bits in data register DR are "0's", and an output $\bar{\mathbf{0}}$ is energized if all the bits in data register DR are not "0's". Output 1 of word decoder 54 is energized if all the bits in data register DR are "1's," and output $\bar{\mathbf{1}}$ is energized if all the bits in data register DR are not "1's." Stated another way, decoder 52 produces an output at 0 if the word in data register DR consists of all "0's," an output at 1 if the word consists of all "1's," and outputs at both $\bar{\mathbf{0}}$ and $\bar{\mathbf{1}}$ if the word consists of mixed "0's" and "1's."

Error indicating "and" gates $\mathbf{0\bar{0}}$, $\mathbf{\bar{0}0}$, $\mathbf{1\bar{1}}$ and $\mathbf{\bar{1}1}$ each have inputs from one of the outputs of flip-flops 36 and 38 and one of the outputs of decoder 52. Any one of the "and" gates $\mathbf{0\bar{0}}$, $\mathbf{\bar{0}0}$, $\mathbf{1\bar{1}}$ and $\mathbf{\bar{1}1}$ is enabled at time $t_1$ if it receives a signal from test storage flip-flop 36, 38 and a signal from the word decoder 52. That is, gate $\mathbf{0\bar{0}}$ is enabled if its receives a 0 output from flip-flop 36 and a $\bar{\mathbf{0}}$ output from word decoder 52; gate $\mathbf{\bar{0}0}$ is enabled if it receives a $\bar{\mathbf{0}}$ output from flip-flop 36 and a 0 output from word decoder 52; gate $\mathbf{1\bar{1}}$ is enabled if it receives a 1 output from flip-flop 38 and a $\bar{\mathbf{1}}$ output from word decoder 52; and gate $\mathbf{\bar{1}1}$ is enabled if it receives a $\bar{\mathbf{1}}$ output from flip-flop 38 and a $\bar{\mathbf{1}}$ output from word decoder 52. An output from one of "and" gates $\mathbf{0\bar{0}}$, $\mathbf{\bar{0}0}$, $\mathbf{1\bar{1}}$ and $\mathbf{\bar{1}1}$ is passed by an "or" gate 55 to provide an error alarm signal on line 57.

The memory, timing generator, registers, decoders, "and" gates, flip-flops, "or" gates and inverter shown in the drawing may be constructed in accordance with well-known conventional practices. Various circuits for accomplishing the functions implicit on the descriptive terms are available for use in the system.

The operation of the system of FIG. 1 will now be described starting with a condition in which the flip-flops 36 and 38 are both reset. At time $t_0$ an information word determined by the contents of address register AR is read from memory ROM to the memory data register DR. The entire contents of the data register DR is conveyed over lines 50 to the all-bits word decoder 52. An information word supplied to decoder 52 consists of mixed "0" and "1" bits. The word decoder 52 therefore generates signals on its outputs $\bar{\mathbf{0}}$ and $\bar{\mathbf{1}}$ indicating that the decoded information word does not consist of all "0's" or all "1's." The gates $\mathbf{0\bar{0}}$ and $\mathbf{1\bar{1}}$ are not enabled from the reset flip-flops 36 and 38 at time $t_1$, with the result that there is no error alarm signal passed to output line 57. On the other hand, if due to some malfunction in the system, the word decoder 52 had received a word consisting of all "0's" or a word consisting all "1's," the 0 output or the 1 output of decoder 52 would have been passed by gate $\mathbf{\bar{0}0}$ or $\mathbf{\bar{1}1}$ to provide an error alarm signal at 57.

The contents of the next address portion NA of the data register DR is decoded by next address decoder 16 which causes the address generator 20 to supply the address of the next word to be accessed through gate 22 to the set input 23 of address register AR at time $t_2$. The address supplied to the address register AR may be affected or modified over lines (not shown) from the function decoder 12. The function decoder 12 receives the contents of the portions F′ F and of data register DR and supplies various control signals to the computer at times $t_1$, $t_2$ and $t_3$.

If the contents of the address register AR is now the address of another information word, the described cycle of operation starting at time $t_0$ is repeated. The operation of the system proceeds with the handling of information words until such time as the information word in data register DR is an information word which is to be followed by a test word, such as a test word consisting of bits which are all "0's." Such an information word includes a next address portion containing the address of all the "0's" test word. This next address is sensed by next address decoder 16 which acts through address generator 20 to supply the address of the all "0's" test word to the address register AR at time $t_2$. The information word also includes a portion located in the portion F′ of the data register DR which contains an indication that the next word will be an all "0's" test word. The test decoder 26 decodes the bit pattern in portion F′ and energizes its output 0. The signal on output 0 passes through gate 31 at time $t_3$ and sets flip-flop 36 to provide a continuing energization of its output lead 0. During the same cycle, at times $t_1$, $t_2$ and $t_3$, the function decoder 12 performs its many functions in response to the contents of portions F′ and F of the data register DR.

At time $t_0$ of the following test-word cycle, the addressed all "0's" test word in memory ROM is transferred to the data register DR. At time $t_1$, the entire contents of the data register DR is decoded by the word decoder 52 to produce energization of its output line 0. The error indicating gate $\mathbf{\bar{0}0}$ is not enabled at time $t_1$ because flip-flop 36 is set and is therefore not supplying a $\bar{\mathbf{0}}$ signal to gate $\mathbf{\bar{0}0}$. Consequently, there is no error alarm signal present on output lead 57. On the other hand, if due to a malfunction in the operation of the system, one of the bits supplied to the word decoder 52 had been a "1", the output $\bar{\mathbf{0}}$ of decoder 52 would have been energized and gate $\mathbf{0\bar{0}}$ would have passed an error alarm signal to output lead 57. To generalize, an error alarm signal is generated whenever the outputs of flip-flops 36 and 38 do not agree with the outputs of word decoder 52.

At time $t_2$ of the cycle during which the data register DR contains the all "0's" test word, the all "0's" contents of the next address portion NA of the data register is not used. At time $t_2$, the set output 0 from flip-flop 36 passes through "or" gate 39, line 40 and invertor I to inhibit "and" gate 22 from passing an address to the set input 23 of address register AR. Instead, the signal on line 40 is passed through "and" gate 42 to the incrementing input of address register AR. The address of an information word which is to follow the all "0's" test word is prearranged to be one number higher than the address of the all "0's" test word. Therefore, the signal applied to the incrementing input of address register AR prepares the system for the next information word cycle.

At time $t_3$ of the all "0's" test word cycle, the all "0's" present in portion F′ of the data register DR are decoded by test decoder 26 which produces an energization of its output $\bar{0}$ that passes through gate 32 and resets flip-flop 36. (According to the previously-given description of the test decoder 26, it responds to the bit pattern 000001 by energizing its output 0 and responds to all other bit patterns by energizing its output $\bar{0}$.) The outputs of flip-flops 36 and 38 are now both reset in preparation for error checking the information word which will follow the all "0's" test word.

The operation of the system in its use of an all "1's" test word is similar to its operation in handling an all "0's" test word, the only difference being that test flip-flop 38 is employed rather than flip-flop 36, and the output $\bar{1}$ or the output 1 from decoder 52 is energized.

Reference is now made to FIG. 2 for a description of another memory system having a slightly different arrangement for determining whether the next word handled is to be an information word, an all "0's" test word or an all "1's" test word. Elements in the system of FIG. 2 which are the same as elements in the system of FIG. 1 are given the same reference designations. The system of FIG. 2 differs in having a next address decoder 16′ which not only has an output 18 coupled to address generator 20 but also has four outputs labeled 0, $\bar{0}$, 1 and $\bar{1}$ which are coupled to gates 31, 32, 33 and 34, respectively. The function performed by the test decoder 26 in the system of FIG. 1 is performed by the next address decoder 16′ in the system of FIG. 2. In FIG. 2, each word stored in memory ROM includes a next address portion containing information used in determining the next following word to be accessed. If an information word in data register DR is an information word to be followed by an all "0's" or an all "1's" test word, the next address portion of the word in the NA portion of the register contains information indicative of the address of the test word, and it consequently also contains information which can be decoded by decoder 16′ to cause energization of appropriate ones of its outputs 0, $\bar{0}$, 1 and $\bar{1}$.

In the operation of the system of FIG. 2, the system proceeds with the sequential handling of information words in the manner described in connection with the system of FIG. 1. Flip-flops 36 and 38 remain reset and each information word when present in data register DR is checked to make sure that it does not consist of all "0's" or all "1's." If the information word does consist of all "0's" or all "1's," an error alarm signal is generated. The next address portion of each information word is utilized by next address decoder 16′ and address generator 20 to fetch each next following information word.

When the word in data register DR is an information word to be followed by a test word consiting of all "0's" or all "1's," the next address portion of the information word contains information indicative of the address of the test word and is decoded by next address decoder 16′. The decoder 16′ acts through address generator 20 at time $t_2$ to supply the next address to address register AR. The decoder 16′ also produces an energization of its output 0 or its output 1 which acts at time $t_3$ to set flip-flop 36 or to set flip-flop 38.

During the next cycle, when the test word is present in data register DR, the all-bits word decoder 52 provides energized signals on output leads 0 or 1, as the case may be. An error signal is generated on line 57 if the outputs of the word decoder 52 do not agree with the outputs of the flip-flops 36 and 38.

When the test word is present in the data register DR, all of the bits of the word are "0's" or all are "1's." Therefore, the next address portion of the word is either all "0's" or all "1's," as the case may be. These bit patterns are recognized by the next address decoder 16′ and used through address generator 20 to generate the address of the next following information word. The operation of the next address decoder 16′ and the address generator 20 may be controlled or influenced by outputs (not shown) from the function decoder 12.

To summarize, the systems shown in both FIGS. 1 and 2 operate in such a way as to generate an error alarm signal whenever an information word should be in data register DR and an all "0's" test word or an all "1's" inverted test word is actually present due to a malfunction. The system also generates an error alarm signal when an all "0's" test word or an all "1's" inverted test word should be present in data register DR, and an information word consisting of mixed "1's" and "0's" is actually present in the data register DR. The system is one in which an error alarm signal is generated whenever there is a malfunction in the memory, its registers, the several decoders or the error checking circuit itself.

What is claimed is:

1. Error checking means in a system handling information words and at least one test word, said information words containing an indication of whether or not the following word in sequence is a test word, a multi-stage register for the current word, test decoder means coupled to a portion of said register stages to provide an output indicative of whether the next following word will be an information word or a test word, test storage means to store the output of said test decoder for use during the presence of the next following word, all-bits word decorder means coupled to all stages of said register to determine whether the current word is an information word or a test word, and error indicating means coupled to said test storage means and said all-bits word decoder means to provide an error signal output when the output of the all-bits word decoder means does not agree with the output of said test storage means.

2. Error checking means in a system including a register sequentially handling information words, a test word and an inverted test word, means coupled to said register to provide an output indicative of whether the next following word will be an information word, a test word, or an inverted test word, storage means to store the output of said last-named means for use during the presence of the next following word, word decoder means coupled to said register to provide an output indicative of whether the current word consists of an information word, a test word, or an inverted test word, and error indicating means coupled to said storage means and said word decoder means to generate an error signal when the output of said word decoder means does not agree with the output of said storage means.

3. Error checking means in a system handling information words consisting of mixed "0's" and "1's," and a test word consisting of all "0's" or all "1's," said information words containing an indication of whether or not the following word in sequence is a test word, a register for the current word, test decoder means coupled to said register to provide an output indicative of whether the next following word will be an information word or a test word, test storage means to store the output of said test decoder for use during the presence of the next following word, word decoder means coupled to said register to determine whether the current word consists of an information word, or a test word, and error indicating means coupled to said test storage means and said word decoder means to generate an error signal when the output of said word decoder means does not agree with the output of said test storage means.

4. Error checking means in a system handling information words, a test word and an inverted test word, said information words containing an indication of whether or not the following word in sequence is a test word or an inverted test word, a register for the current word, test decoder means coupled to said register to provide an output indicative of whether the next following word will be an information word, a test word, or an inverted test word, test storage means to store the output of said test decoder for use during the presence of the next following word, word decoder means coupled to said register to determine whether the current word consists of an information word, or a test word, or an inverted test word, and error indicating means coupled to said test storage means and said word decoder means to generate an error signal when the output of said word decoder means does not agree with the output of said test storage means.

5. Error checking means in a system handling information words consisting of mixed "0's" and "1's," and interspersed test words consisting of all "0's" or all "1's," said information words containing an indication of whether or not the following word in sequence is one or the other of said test words, a register for the current word, test decoder means coupled to said register to provide an output indicative of whether the next following word will be an information word or an all "0's" test word or an all "1's" test word, test storage means to store the output of said test decoder for use during the presence of the next following word, word decoder means coupled to said register to determine whether the current word consists of an information word, or an all "0's" test word, or an all "1's" test word, and error indicating means coupled to said test storage means and said word decoder means to generate an error signal when the output of said word decoder means does not agree with the output of said test storage means.

6. A memory system including error checking means, comprising a memory having an address register and a data register, the memory words stored in said memory including many information words, a test word and an inverted test word, each word including an indication of whether or not the next following word will be an information word, a test word, or an inverted test word, test decoder means coupled to the data register to provide an output indicative of whether the next following word will be an information word, a test word, or an inverted test word, storage means coupled to outputs of said test decoder means and having outputs for information word, test word and inverted test word, memory word decoder means coupled to said data register and having outputs for an information word, a test word and an inverted test word, and error indicating means coupled to said storage means and said memory word decoder means to generate an error signal when the output of said memory word decoder means does not agree with the output of said storage means.

7. A memory system including error checking means, comprising a memory having an address register and a multi-stage data register, the memory words stored in said memory including many information words consisting of mixed "0's" and "1's," one test word consisting of all "0's" and one test word consisting of all "1's," each word including an indication of whether or not the next following word will be an information word or a test word, test decoder means coupled to a portion of the data register stages to provide an output indicative of whether the next following word will be an information word, or an all "0's" test word, or an all "1's" test word, storage means coupled to outputs of said test decoder means and having outputs for information word, all "0's" test word and all "1's" test word, memory word decoder means coupled to all stages of said data register and having outputs for a mixed "0's" and "1's" information word, an all "0's" test word and an all "1's" test word, and error indicating means coupled to said storage means and said memory wrod decoder means to generate an error signal when the output of said memory word decoder means does not agree with the output of said storage means.

8. A memory system including error checking means, comprising a memory having an address register and a multi-stage data register, the memory words stored in said memory including many information words consisting of mixed "0's" and "1's," one test word consisting of all "0's" and one test word consisting of all "1's," each word including an indication of whether or not the next following word will be an information word or a test word, test decoder means coupled to a portion of the data register stages to provide an output indicative of whether the next following word will be an information word, or an all "0's" test word, or an all "1's" test word, flip-flop storage means coupled to outputs of said test decoder means and having outputs for information word, all "0's" test word and all "1's" test word, memory word decoder means coupled to all stages of said data register and having outputs for a mixed "0's" and "1's" information word, an all "0's" test word and an all "1's" test word, and gate means coupled to the outputs of said flip-flop storage means and the outputs of said memory word decoder means to provide an output error alarm signal when there is an information word output signal from said flip-flop storage means together with an all "0's" output or an all "1's" output signal from said memory word decoder means, when there is a "0's" test output signal from said flip-flop storage means together with the absence of an all "0's" output signal from said memory word decoder means, and when there is a "1's" test output signal from said flip-flop storage means together with the absence of an all "1's" output signal from said memory word decoder means.

9. A memory system including error checking means, comprising a memory having an address register and a data register, said data register having a functions portion and a next address portion for corresponding portions of each memory word, the memory words stored in said memory including many information words consisting of mixed "0's" and "1's," one test word consisting of all "0's" and one test word consisting of all "1's," said functions portion of each information word containing an indication of whether or not the following word in sequence is one or the other of said test words, test decoder means coupled to said functions portion of the data register to provide an output indicative of whether the next following word will be an information word, or an all "0's" test word or an all "1's" test word, memory word decoder means coupled to all portions of said data register and having outputs for a mixed "0's" and "1's" information word, an all "0's" test word and an all "1's" test word, and error indicating means coupled to said flip-flop storage means and said memory word decoder means to generate an error signal when the output of said memory word decoder means does not agree with the output of said test storage means.

10. A system as defined in claim 9, and in addition next address decode and address generation means coupled from the next address portion of said data register to said address register, and means responsive to an all "0's" output signal or an all "1's" output signal from said flip-flop storage means to increment the contents of said address register and to bar the transfer of an address to said address register from said next address decode and address generation means.

11. A read-only memory system including error checking means, comprising a memory having an address register and a data register, said data register having a functions portion and a next address portion for corresponding portions of each memory word, the memory words stored in said memory including many information words consisting of mixed "0's" and "1's," one test word consisting of all "0's" and one test word consisting of all "1's," said functions portion of each information word containing an indication of whether or not the following word in sequence is one or the other of said test words, test decoder means coupled to said functions portion of the data register to provide an output indicative of whether the next following word will be an information word, or an all "0's" test word, or an all "1's" test word, flip-flop storage means coupled to said test decoder means and having outputs for information word, all "0's" test word and all "1's" test word, memory word decoder means coupled to all portions of said data register and having outputs for a mixed "0's" and "1's" information word, an all "0's" test word and an all "1's" test word, gate means coupled to the outputs of said flip-flop storage means and the outputs of said memory word decoder means to provide an output error alarm signal when there is an information word output signal from said flip-flip storage means together with an all "0's" output or an all "1's" output signal from said memory word decoder means, when there is a "0's" test output signal from said flip-flop storage means together with the absence of an all "0's" output signal from said memory word decoder means, and when there is a "1's" test output signal from said flip-flop storage means together with the absence of an all "1's" output signal from said memory word decoder means, next address decode and address generation means coupled from the next address portion of said data register to said address register, and means responsive to an all "0's" output signal or an all "1's" output signal from said flip-flop storage means to increment the contents of said address register and to bar the transfer of an address to said address register from said next address decode and address generation means.

12. A memory system including error checking means, comprising a memory having an address register and a data register, said data register having a next address portion for a corresponding portion of each memory word, the memory words stored in said memory including many information words, and one inverted test word, next address decoder means coupled to said next address portion of the data register to provide an output indicative of whether the next following word will be an information word, a test word, or an inverted test word, storage means coupled to outputs of said next address decoder means and having outputs for information word, test word and inverted test word, memory word decoder means coupled to all portions of said data register and having outputs for information word, test word and inverted test word, and error indicating means coupled to said storage means and said memory word decoder means to generate an error signal when the output of the memory word decoder means does not agree with the output of said storage means.

13. A memory system including error checking means, comprising a memory having an address register and a data register, said data register having a next address portion for a corresponding portion of each memory word, the memory words stored in said memory including many information words consisting of mixed "0's" and "1's" one test word consisting of all "0's" and one test word consisting of all "1's", next address decoder means coupled to said next address portion of the data register to provide an output indicative of whether the next following word will be an information word, or an all "0's" test word, or an all "1's" test word, flip-flop storage means coupled to outputs of said next address decoder means and having outputs for information words, all "0's" test words and all "1's" test word, memory word decoder means coupled to all portions of said data register and having outputs for a mixed "0's" and "1's" information word, an all "0's" test word and an all "1's" test word, and error indicating means coupled to said flip-flop storage means and said memory word decoder means to generate an error signal when the output of the memory word decoder means does not agree with the output of said flip-flop storage means.

14. A read-only memory system including error checking means, comprising a memory having an address register and a data register, said data register having a functions portion and a next address portion for corresponding portions of each memory word, the memory words stored in said memory including many information words consisting of mixed "0's" and "1's," one test word consisting of all "0's" and one test word consisting of all "1's", next address decoder means coupled to said next address portion of the data register to provide an output indicative of the address of the next following word and to determine whether the next following word will be an information word, or an all "0's" test word, or an all "1's" test word, flip-flop storage means coupled to outputs of said next address decoder means and having outputs for information word, all "0's" test word and all "1's" test word, memory word decoder means coupled to all portions of said data register and having outputs for a mixed "0's" and "1's" information word, an all "0's" test word and an all "1's" test word, gate means coupled to the outputs of said flip-flop storage means and the outputs of said memory word decoder means to provide an output error alarm signal when there is an information word output signal from said flip-flop storage means together with an all "0's" output or an all "1's" output signal from said memory word decoder means, when there is a "0's" test output signal from said flip-flop storage means together with the absence of an all "0's" output signal from said memory word decoder means, and when there is a "1's" test output signal from said flip-flop storage means together with the absence of an all "1's" output signal from said memory word decoder means, and next address generation means coupled from said next address decoder to said address register.

References Cited

UNITED STATES PATENTS

| | | | |
|---|---|---|---|
| 2,958,072 | 10/1960 | Batley ---------- | 340—146.1 X |
| 3,231,858 | 1/1966 | Tuomenoksa et al. -- | 340—146.1 |

MALCOLM A. MORRISON, *Primary Examiner.*

C. E. ATKINS, *Assistant Examiner.*

U.S. Cl. X.R.

340—146.1

UNITED STATES PATENT OFFICE
CERTIFICATE OF CORRECTION

Patent No. 3,420,991 January 7, 1969

Andrew T. Ling

It is certified that error appears in the above identified patent and that said Letters Patent are hereby corrected as shown below:

Column 1, line 17, "onsisting" should read -- consisting --; line 46, before "symbols" insert -- special --. Column 3, line 5, "world" should read -- word --; line 60, before "one" insert -- any --. Column 8, line 20, "wrod" should read -- word --.

Signed and sealed this 14th day of April 1970.

(SEAL)
Attest:

Edward M. Fletcher, Jr.
Attesting Officer

WILLIAM E. SCHUYLER, JR.
Commissioner of Patents